(12) United States Patent
Zhu et al.

(10) Patent No.: US 9,502,063 B1
(45) Date of Patent: Nov. 22, 2016

(54) APPARATUS AND METHOD FOR MEASURING SLIDER FLY HEIGHT RELATIVE TO BIT PATTERNED MEDIA

(71) Applicant: Seagate Technology LLC, Cupertino, CA (US)

(72) Inventors: Wenzhong Zhu, Apple Valley, MN (US); Bruce D. Buch, Westborough, MA (US); Kenneth Haapala, Plymouth, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/987,028

(22) Filed: Jan. 4, 2016

(51) Int. Cl.
*G11B 5/60* (2006.01)
*G11B 21/21* (2006.01)

(52) U.S. Cl.
CPC ............ *G11B 5/6029* (2013.01); *G11B 21/21* (2013.01)

(58) Field of Classification Search
None
See application file for complete search history.

(56) References Cited

U.S. PATENT DOCUMENTS

| | | | | |
|---|---|---|---|---|
| 6,108,152 A * | 8/2000 | Du | ........................ | G11B 19/04 360/51 |
| 6,754,017 B2 * | 6/2004 | Rettner | .................. | G11B 5/012 360/51 |
| 7,271,753 B1 * | 9/2007 | Padukone | ................ | G11B 5/58 341/139 |
| 7,724,462 B2 | 5/2010 | Duan et al. | | |
| 7,808,734 B2 * | 10/2010 | Eaton | .................... | G11B 5/6005 360/75 |
| 7,889,450 B2 | 2/2011 | Vikramaditya et al. | | |
| 7,969,676 B2 | 6/2011 | Buch et al. | | |
| 8,077,427 B2 * | 12/2011 | Mathew | ................. | G11B 5/012 360/75 |
| 8,526,133 B2 * | 9/2013 | Xia | ...................... | G11B 5/6029 360/75 |
| 8,548,038 B2 | 10/2013 | Sindalovsky et al. | | |
| 9,177,583 B2 * | 11/2015 | Jang | ..................... | G11B 5/6029 |
| 2009/0116352 A1 * | 5/2009 | Itakura | ............... | G11B 5/59616 369/47.48 |
| 2012/0229928 A1 * | 9/2012 | Sakai | ................... | G11B 5/6029 360/31 |

\* cited by examiner

*Primary Examiner* — Wayne Young
*Assistant Examiner* — James L Habermehl
(74) *Attorney, Agent, or Firm* — Hollingsworth Davis, LLC

(57) ABSTRACT

A slider having a reader and a writer is moved relative to a magnetic bit pattern medium comprising magnetic dots arranged to include a plurality of pre-written servo sectors, data fields defined between servo sectors to which data can be written and erased, and pre-written timing synchronization fields interspersed within the data fields. In some approaches, two different tone patterns are read from one or more of the timing synchronization fields, and fly height of the slider is determined using the two different tone patterns. In other approaches, two odd harmonics are demodulated from a mixed tone pattern read from one or more of the timing synchronization fields, and fly height of the slider is determined using the two odd harmonics.

22 Claims, 12 Drawing Sheets

APPARATUS AND METHOD FOR MEASURING SLIDER FLY HEIGHT RELATIVE TO BIT PATTERNED MEDIA

SUMMARY

According to some embodiments, a method comprises moving a slider having a reader and a writer relative to a magnetic bit pattern medium comprising magnetic dots arranged to include a plurality of pre-written servo sectors, data fields defined between servo sectors to which data can be written and erased, and pre-written timing synchronization fields interspersed within the data fields. The method also comprises reading two different tone patterns from one or more of the timing synchronization fields, and determining fly height of the slider using the two different tone patterns.

In accordance with other embodiments, an apparatus comprises a slider configured to magnetically interact with a magnetic bit pattern medium comprising magnetic dots arranged to include a plurality of pre-written servo sectors, data fields defined between servo sectors to which data can be written and erased, and pre-written timing synchronization fields interspersed within the data fields. A reader of the slider is configured to read two different tone patterns from one or more of the timing synchronization fields. A detector is configured to determine fly height of the slider using the two different tone patterns.

According to further embodiments, a method comprises moving a slider having a reader and a writer relative to a magnetic bit pattern medium comprising magnetic dots arranged to include a plurality of pre-written servo sectors, data fields defined between servo sectors to which data can be written and erased, and pre-written timing synchronization fields interspersed within the data field. The method also comprises demodulating two odd harmonics of a mixed tone pattern read from one or more of the timing synchronization fields, and determining fly height of the slider using the two odd harmonics.

In accordance with some embodiments, an apparatus comprises a magnetic bit pattern medium comprising a plurality of magnetic dots arranged to include a plurality of pre-written servo sectors, a plurality of data fields defined between servo sectors to which data can be written and erased, and a plurality of pre-written timing synchronization fields interspersed within the data fields. The synchronization fields comprise a first tone pattern pre-written to each of the timing synchronization fields and configured to facilitate synchronization of writing to magnetic dots of the data fields. The synchronization fields comprise a second tone pattern different from the first tone pattern and pre-written to at least some of the timing synchronization fields. The first and second tone patterns are configured to facilitate slider fly height determinations.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments are directed to apparatuses and methods for determining fly height of a slider moving relative to a bit patterned medium (BPM). Some embodiments are directed to measuring slider fly height using two different tone patterns pre-written to timing synchronization fields interspersed between data fields of a BPM. Other embodiments are directed to measuring slider fly height using two odd harmonics of a mixed tone pattern pre-written to timing synchronization fields interspersed between data fields of a BPM. Further embodiments are directed to concurrently determining fly height of a slider and performing write synchronization using two different tone patterns or two odd harmonics of a mixed tone pattern written to timing synchronization fields interspersed between data fields of a BPM. Some embodiments are directed to a bit patterned medium that includes two different tone patterns pre-written to timing synchronization fields interspersed between data fields. Other embodiments are directed to a bit patterned medium that includes a mixed tone pattern from which two odd harmonics can be demodulated, such that an amplitude of the two odd harmonics is about the same. Further embodiments are directed to a servo writer and servo writing methodology that produces a bit patterned medium of a type disclosed herein.

Figure 1:
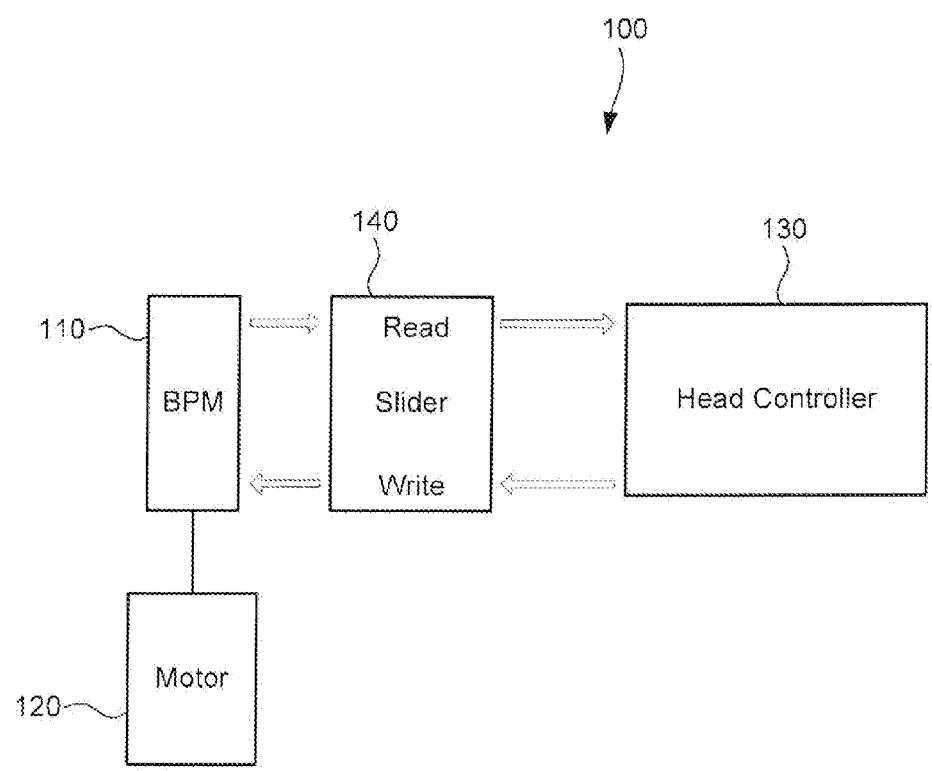
FIG. 1 illustrates an exemplary system that may be used in accordance with various illustrative embodiments.

FIG. 1 illustrates an exemplary system 100 that comprises a magnetic recording medium 110, such as a magnetic disk, that may be used in accordance with various illustrative embodiments. The medium 110 may comprise, for example, a magnetic recording layer deposited on a substrate, as will be understood by those skilled in the art. The medium 110 also may include other magnetic or non-magnetic layers, such as a soft magnetic underlayer, exchange-coupled layer, lubrication layer, carbon overcoat, etc., which are not explicitly shown. The recording layer may be fabricated using various ferromagnetic materials and alloys, e.g., embodied as thin-film or particulate media, and may be deposited on the substrate using a variety of deposition techniques known in the art in accordance with bit patterned media (BPM) as described herein. The substrate also may be constructed from various materials, such as glass or conventional aluminum-magnesium substrates used for magnetic disks. The system 100, such as a disk drive, may also comprise a motor 120 used to spin the medium 110, as well as a head controller 130 to control a slider 140 comprising a read-write head.

The read-write head of the slider 140 reads information from and writes information to the medium 110, which is spun by the motor 120. The head controller 130 (e.g., circuitry used to control the track, position, timing, phase, etc. of the reading and writing operations and circuitry) receives information (e.g., data or timing information) from the read-write head of the slider 140, and provides information to the read-write head.

The medium 110 is arranged as a bit patterned medium, which provides patterns of magnetic regions (e.g., "dots" or "islands") within non-magnetic material (e.g., "troughs"). In bit patterned media, the magnetic material on a disk is patterned into small isolated blocks or islands (referred to herein generally as "dots") such that there is a single magnetic domain in each island or "bit". The single magnetic domains can be a single grain or a few strongly coupled grains that switch magnetic states in concert as a single magnetic volume. To produce the required magnetic isolation of the patterned blocks, the regions between the blocks (e.g., troughs) are essentially nonmagnetic. For efficient use of the BPM storage capacity, write operations to BPM should be aligned such that write current transitions are synchronized with the patterns of dots, i.e., efficient use of BPM capacity requires tight synchronization of the write clock to the phase and frequency of the medium itself (i.e., to the dots). The write operations, if not synchronized to the dots, may be attempting to write between the dots on the non-magnetic areas of the medium or dots may be skipped, thereby reducing the effective storage capacity of the media.

Various techniques can be employed to provide for sampled observation of write clock timing offset relative to dot timing when writing, where the timing signals are read from respective timing synchronization fields interspersed within data fields of the medium 110. According to various embodiments, the timing synchronization (TS) fields can also be referred to as phase-lock loop (PLL) fields. A control scheme can be employed to adjust the phase of the write clock used in the subsequent data field for writing discerned from calibrations, and, through continually-applied injections, adjusts the frequency of the write clock based on the timing offsets, which are determined using the signals previously read from the TS fields. The write clock timing then coasts in between TS fields, while a write operation continues with a write clock having updated phase and frequency. When the reader arrives at a next TS field, data writing is suspended while timing information is extracted from the TS field.

Figure 2A:
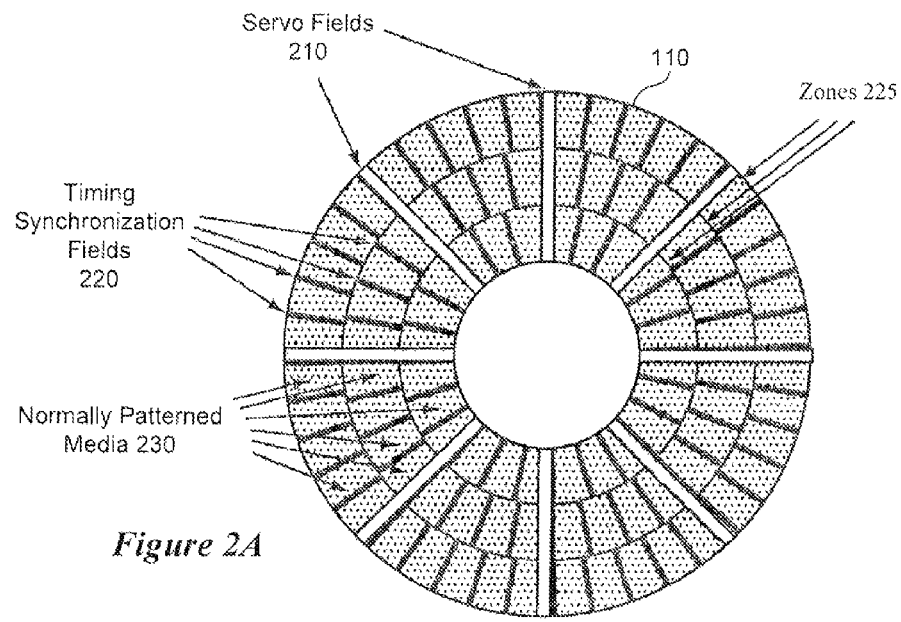
FIG. 2A illustrates the format of a bit patterned medium that may be used in accordance with various illustrative embodiments.
Figure 2B:
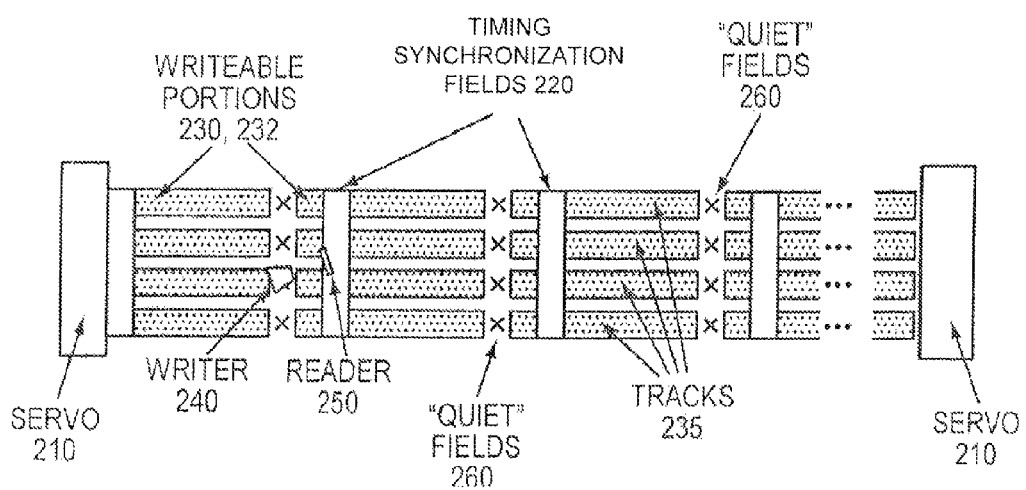
FIG. 2B is a detailed illustration of several tracks of a bit patterned medium that may be used in accordance with various illustrative embodiments.

FIG. 2A illustrates the format of BPM (e.g., medium 110) configured to support the logical format shown in FIG. 2B. In the representative BPM format shown in FIG. 2B, the medium 110 includes various servo fields/areas 210 and TS fields 220, but makes no assumptions about servo field position relative to the TS fields 220. In other words, the TS fields 220 are decoupled from the servo fields 210 in terms of positioning and density (number per revolution). In the illustrative example shown in FIGS. 2A and 2B, it is assumed that the TS fields 220 occur more frequently than the servo fields 210.

The servo fields 210 are radially coherent across the surface of the medium 110. In the representative example shown in FIGS. 2A and 2B, the TS fields 220 are radially coherent within a "zone" 225. According to some embodiments, within a zone 225, the same number of dots occur between TS fields 220, and thus, the radially coherent TS fields 220 are read at regular dot intervals (where being radially coherent within a zone implies that the same signal may be read from a read head position anywhere across the zone). Since the TS fields 220 provide a timing reference for the zone 225, this per-zone radial coherence is consistent with the patterning of data dots for constant-density recording per-zone. In other words, each data portion 230 between a pair of TS fields 220 within a zone 225 comprises the same number of dots, spaced at a same linear frequency according to the radial position of the zone on the underlying disk surface. Illustratively, the dot pattern of the TS fields 220 provides readback of a signal that is recorded with a predetermined number of dots per cycle. As will be described hereinbelow, in some embodiments, at least two different tone patterns are recording in the TS fields 220 to facilitate techniques for determining fly height of the slider 140 relative to the surface of the medium 110. In other embodiments, a single mixed tone pattern is recorded in the TS fields 220 from which two odd harmonics can be demodulated for determining fly height of the slider 140 relative to the surface of the medium 110. The two odd harmonics can be demodulated by the read channel (e.g., head controller 130).

Data are written to and read from the regions 230 (data fields) between the interspersed TS fields 220. It is noted that the TS fields 220 can be aligned to logical block boundaries to simplify format control, but that such alignment is not necessary. In the representative example shown in FIGS. 2A and 2B, the data fields 230 are interrupted with the permanently written (e.g., "read-only"), radially coherent TS fields 220. The "X's" shown in FIG. 2B illustrate unused areas in the format that roughly match the length of the interspersed TS fields 220. These "quiet" fields 260 correspond to the position of the writer 240 when the reader 250 is over the radially coherent TS fields 220.

FIG. 2B illustrates a representative view of information stored on a BPM 110 having interspersed TS fields in accordance with various embodiments. In particular, between conventional servo fields 210, one or more TS fields 220 may be interspersed at predefined intervals within writeable fields 230 of tracks 235 (e.g., four tracks 235 are shown). A read-write head of a slider 140 is illustrated, with a writer 240 and a reader 250 that are separated by a known distance.

According to some embodiments, the TS fields 220 comprise one of two or more different tone patterns. In other embodiments, at least some of the TS fields 220 comprise at least two different tone patterns. For example, the different tone patterns can comprise a 2T preamble and a 3T preamble. The 2T and 3T preambles comprise known patterns that produce a periodic read-back waveform with a known period of a specified number of magnetic dots. A 2T preamble, for example, can be represented by four dots recorded with the pattern 1100 (e.g., 2 dots followed by 2 voids). A 3T preamble, for example, can be represented by six dots recorded with the pattern 111000 (e.g., 3 dots followed by 3 voids). The 2T and 3T patterns can be bipolar or unipolar as is known in the art. It is understood that patterns other than 2T and 3T preambles can be pre-written to the TS fields 220 to facilitate write synchronization and fly height determinations according to embodiments of the disclosure. According to some embodiments, a mixed tone pattern (e.g., a mixture of 1T and 3T tone patterns) is pre-written to at least some of the TS fields 220 from which two different odd harmonics are demodulated and used for slider fly height determinations. The mixed tone pattern can also be used for write synchronization, in which case the mixed tone pattern would be pre-written to each of the TS fields 220.

As previously discussed, and according to some embodiments, when writing data fields 230, the signals read from the interspersed TS fields 220 are sampled for use in updating the phase and frequency of the write clock relative to the medium 110. Data writing is suspended during the reading of the TS fields 220, to obviate the complications of read-while-write operations and circuitry. Thereafter, data writing is resumed in sections 232 of the data fields, which can be referred to as "runt" data fields. Note that the length of the runt fields 232 roughly corresponds to the nominal writer-reader separation (i.e., the distance between writer 240 and reader 250).

Write synchronization implemented using the TS fields 220 can involve a three-step methodology. First, a TS field 220 is read by reader 250 (see FIG. 2B), and data writing is suspended (thus, quiet field 260). Second, write clock phase corrections are calculated, and third, the write clock phase and frequency control is updated. Illustratively, these second and third steps may be executed immediately after TS field 220 is read, and before the write of the data field 230. According to another implementation, these steps may be completed during completion of writing data field 230, or may wait until the writer is over the TS field 220 when data writing is suspended to apply the phase and frequency control update. The controller applies a phase update as a step and a frequency update over the entire interval between TS fields 220 as a continuously applied phase offset, until the process is repeated at the next TS field 220. Additional details of write synchronization using TS fields 220 according to various embodiments are disclosed in commonly owned, U.S. Pat. No. 7,969,676, which is incorporated herein by reference.

Embodiments of the disclosure are directed to determining slider fly height for bit patterned media using timing synchronization fields that are also used for write synchronization. Some embodiments are directed to determining slider fly height for bit patterned media using timing synchronization fields containing different tone patterns, such as two different single tone patterns. Other embodiments are directed to determining slider fly height for bit patterned media using timing synchronization fields containing a mixed tone pattern, from which two odd harmonics can be demodulated. According to various embodiments, fly height of a slider can be measured using the following Wallace Spacing Loss equation:

$$AR_d = ke^{-2\pi d\left(\frac{1}{\lambda_{freq_1}} - \frac{1}{\lambda_{freq_2}}\right)} \quad [1]$$

$$d = -\frac{1}{2\pi}\left(\frac{1}{\lambda_{freq_1}} - \frac{1}{\lambda_{freq_2}}\right)^{-1} \ln(AR_d) + f(k)$$

$$\Delta d = d - d_{ref} = -\frac{1}{2\pi}\left(\frac{1}{\lambda_{freq_1}} - \frac{1}{\lambda_{freq_2}}\right)^{-1} \ln\left(\frac{AR_d}{AR_{ref}}\right)$$

where $AR_d$ is the amplitude ratio at a given head-medium spacing distance, d, k is a constant that, along with f(k), falls out of Equation [1], $\lambda_{freq_1}$ is the write frequency of the first harmonic of a first tone pattern (or the first harmonic of a mixed tone pattern), $\lambda_{freq_2}$ is the write frequency of the first harmonic of a second tone pattern (or the of the mixed tone pattern), $d_{ref}$ is the reference head-medium spacing distance (e.g., for head-medium contact), $AR_{ref}$ is the amplitude ratio at the reference head-medium spacing distance, $d_{ref}$, and $\Delta d$ is the change in spacing distance between d and $d_{ref}$. It is understood that $\Delta d$ can represent absolute fly height of the slider by using head-medium contact as the reference head-medium spacing distance, $d_{ref}$.

Figure 3:
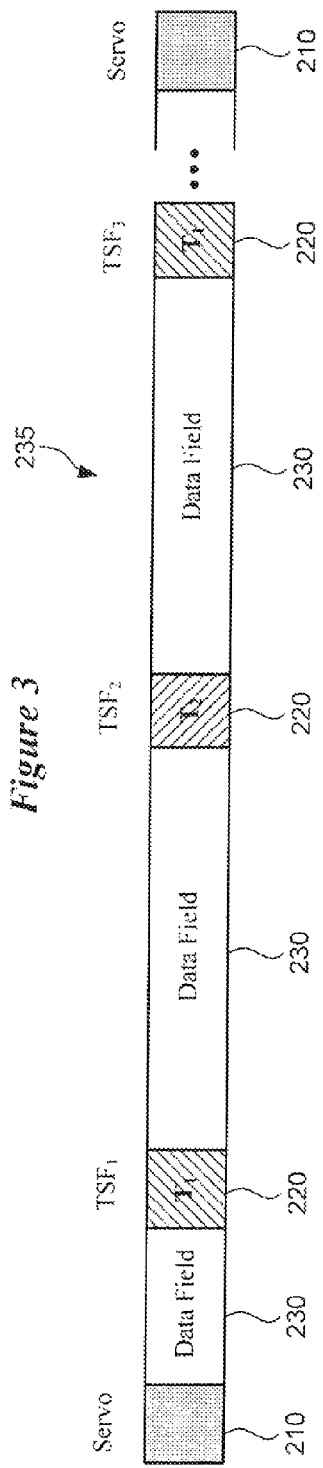
FIG. 3 illustrates a track of a bit pattern medium that includes timing synchronization fields containing different tone patterns interspersed between data fields in accordance with various embodiments.

FIG. 3 illustrates a track of a bit pattern medium that includes timing synchronization fields containing different tone patterns interspersed between data fields in accordance with various embodiments. In particular, FIG. 3 shows a portion of a data track 235 of a bit pattern medium 110 bounded by servo sectors or wedges 210. Disposed between the servo sectors 210 is a data field 230 comprising magnetic dots to which data (e.g., user data) can be written and erased. Interspersed within the data field 230 is a multiplicity of timing synchronization fields 220. In the embodiment shown in FIG. 3, alternating tone patterns, $T_1$ and $T_2$, are pre-written to the timing synchronization fields 220. In particular, timing synchronization field $TSF_1$ contains a first tone pattern, $T_1$, timing synchronization field $TSF_2$ contains a second tone pattern, $T_2$, timing synchronization field $TSF_3$ contains the first tone pattern, $T_1$, timing synchronization field $TSF_4$ (not shown) contains the second tone pattern, $T_2$, and so on. According to some embodiments, the first tone pattern, $T_1$, is a 2T pattern, and the second tone pattern, $T_2$, is a 3T pattern.

The alternating tone patterns, $T_1$ and $T_2$, are read by the reader 250 of the slider 140 as the track 235 moves relative to the slider 140. After a pair of the alternating tone patterns, $T_1$ and $T_2$, has been read by the reader 250, a processor of the head controller 130 is configured to measure the first harmonic of the tone pattern signal amplitudes and calculate fly height of the slider 140 using Equation [1] above. Slider fly height can be calculated after reading each subsequent pair of alternating tone patterns, $T_1$ and $T_2$. In some embodiments, the predetermined number, N (e.g., N=5 or 10), of fly height calculations are used to compute an average slider fly height. Depending on the number of timing synchronization fields 220 containing different tone patterns (e.g., $T_1$ and $T_2$), slider fly height can be calculated a multiplicity of times during each disk revolution (e.g., each data sector).

It is noted that the aforementioned write synchronization operations can be performed concurrently with the fly height computations. For example, a phase detector of the head controller 130 processes the first tone pattern, $T_1$ read from $TSF_1$ and computes the phase/frequency of the write clock relative to the magnetic dots of the track 235. Updates to the write clock are made in response to reading the second tone pattern, $T_2$, read from $TSF_2$. This process of updating the write clock is repeated using the tone pattern recorded at each of the timing synchronization fields 220.

Figure 4:
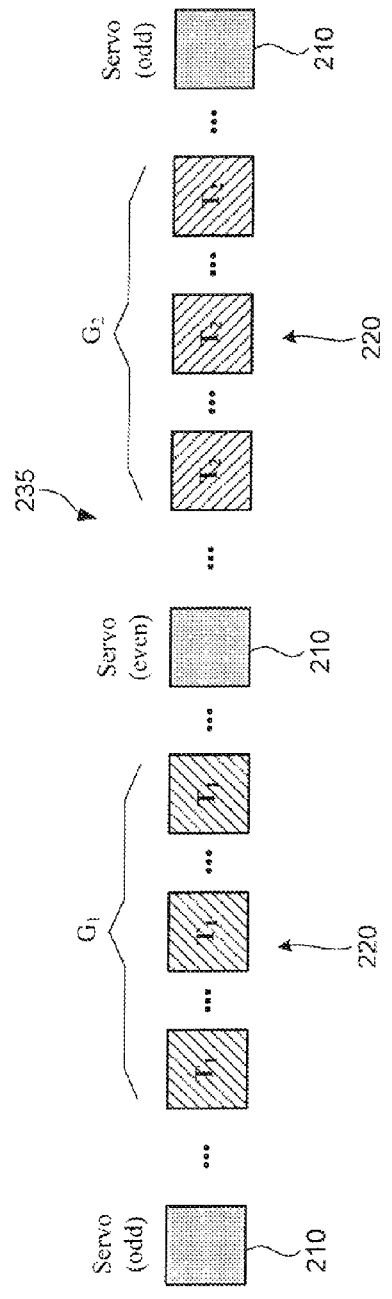
FIG. 4 illustrates a track of a bit pattern medium that includes groups of timing synchronization fields containing groups of different tone patterns interspersed between data fields in accordance with various embodiments.

FIG. 4 illustrates a track of a bit pattern medium that includes timing synchronization fields containing groups of different tone patterns interspersed between data fields in accordance with other embodiments. According to the embodiment shown in FIG. 4, a track 235 of a bit pattern medium 110 includes alternating groups, $G_1$ and $G_2$, of timing synchronization fields 220. Each group, $G_1$ and $G_2$, includes timing synchronization fields 220 containing the same tone pattern. For example, group $G_1$ includes a multiplicity of timing synchronization fields 220 containing a first tone pattern, $T_1$. Group $G_2$ includes a multiplicity of timing synchronization fields to 20 containing a second tone pattern, $T_2$.

As a shown in FIG. 4, a particular group of timing synchronization fields 220 is disposed between a given pair of servo sectors 210, and the different TSF groups alternate between servo sectors 210. According to some embodiments, the timing synchronization fields 220 of group $G_1$ containing tone pattern $T_1$ follow odd-numbered servo sectors 210, while the timing synchronization fields 220 of group $G_2$ containing tone pattern $T_2$ follow even-numbered servo sectors 210. In the representative example shown in FIG. 4, the first tone pattern, $T_1$, can be a 2T pattern, and the second tone pattern, $T_2$, can be a 3T pattern. As in the case of the previous embodiment, write synchronization operations can be performed concurrently with the fly height computations.

Figure 5:
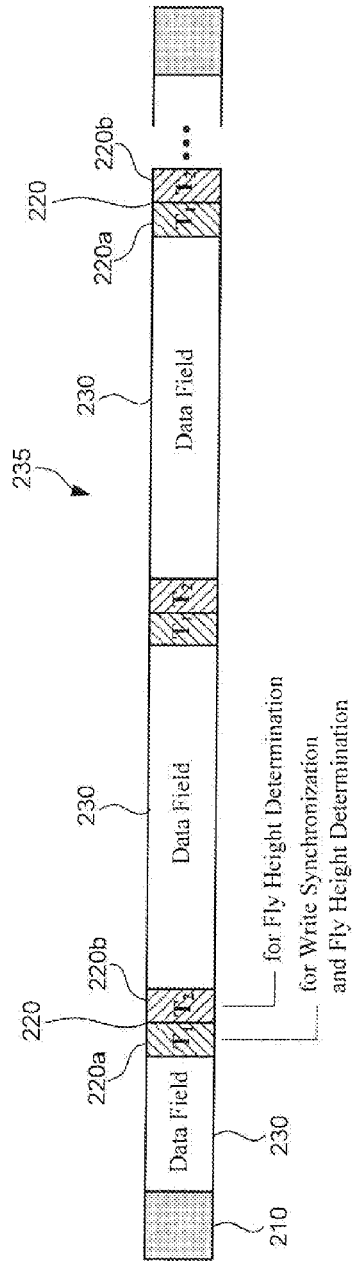
FIG. 5 illustrates a track of the bit pattern medium that includes timing synchronization fields containing different tone patterns interspersed between data fields in accordance with other embodiments.

FIG. 5 illustrates a track of the bit pattern medium that includes timing synchronization fields containing different tone patterns interspersed between data fields in accordance with further embodiments. According to the embodiment shown in FIG. 5, each timing synchronization field 220 interspersed within a data field 230 contains a multiplicity of tone patterns that are used to calculate slider fly height. More particularly, one of the multiplicity of tone patterns is used for fly height determinations, and one of the multiplicity of tone patterns is used for both flight height determinations and write synchronization. It is noted that, according to some embodiments, two different tone patterns of a timing synchronization field 220 can be used for fly height determinations, and a third tone pattern can be used exclusively for write synchronization.

Referring now to the particular embodiment illustrated in FIG. 5, each of the timing synchronization fields 220 includes two different tone patterns 220a and 220b. A first tone pattern 220a (T1, e.g., a 2T pattern) is used for write synchronization and fly height determinations. A second tone pattern 220b (T2, e.g., a 3T pattern) is used exclusively for fly height determinations. Accordingly, individual timing synchronization fields 220 that include at least two different single tone patterns can be used for both write synchronization and fly height determinations in accordance with various embodiments.

Inclusion of two different tone patterns 220a and 220b in each synchronization field 220 as shown in FIG. 5 reduces format efficiency in comparison to the orthogonal tone pattern format shown in FIG. 3. To increase format efficiency, some, but not all, of the synchronization fields 220 can contain two consecutive (and different) tone patterns. Rather than each synchronization field 220 containing two different tone patterns, T1, and T2, every $n^{th}$ synchronization field 220 can contain the two different tone patterns, $T_1$ and $T_2$ (e.g., where n is an integer between 2 and 8). For example, if a system requires four updates per data field wedge (data field 230 defined between two servo sectors 210) for write synchronization, but only one fly height measurement per wedge, then each wedge would include three single tone timing synchronization fields 220 (e.g., T1) and one timing synchronization field 220 having two consecutive and different single tone patterns (e.g., T1 and T2).

Figure 6:
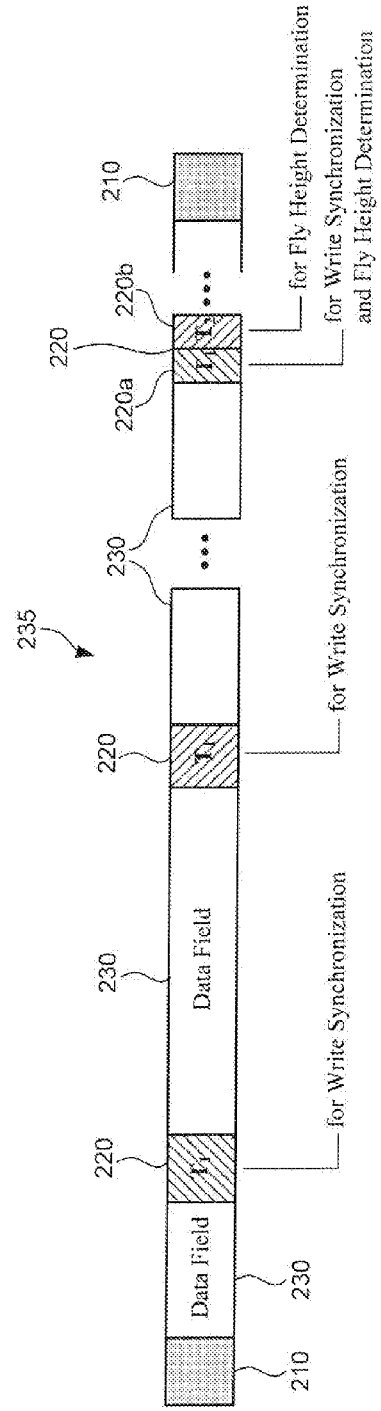
FIG. 6 shows a track of a bit pattern medium that includes a number of timing synchronization fields provided between servo sectors in accordance with some embodiments.

FIG. 6 shows a track 235 of a bit pattern medium 110 that includes a number of timing synchronization fields 220 provided between servo sectors 210. The first two synchronization fields 220 shown in FIG. 6 contain a first tone pattern T1, which are used for write synchronization. A subsequent timing synchronization field 220 shown in FIG. 6 includes two different consecutive tone patterns, T1 and T2. For this dual tone synchronization field 220, the first tone pattern, T1, is used for write synchronization, and both tone patterns T1 and T2 are used for calculating slider fly height.

According to other embodiments, another technique for measuring slider fly height involves demodulating two odd harmonics of a single mixed-tone pattern read from a timing synchronization field 220. For example, the first and third harmonics of a single tone pattern of a timing synchronization field 220 can be used to calculate fly height using Equation [1] above, such that the first frequency in Equation [1] is the first harmonic and the second frequency in Equation [1] is the third harmonic. However, since the third harmonic magnitude is much smaller than the first harmonic magnitude, measurement error is introduced at a low signal-two-noise ratio (SNR) condition. According to one approach, a mixed tone pattern that combines a 1T tone pattern and a 3T tone pattern provides comparable energy intensity between the first and third harmonics. It is noted that a 1T tone pattern or preamble can be represented by two dots recorded with the pattern 10 (e.g., 1 dot followed by 1 void).

For example, a mixed tone pattern of 111010 or 101000 for a unipolar timing synchronization field 220 can be used, where 1 represents a magnetic dot, and 0 represents a void or absence of a magnetic dot. Referring once again to FIG. 3, each of the timing synchronizing fields 220 can be pre-written with the same single mixed tone pattern (e.g., $T_1$) interspersed within the data fields 230 of each track 235. As such, the tone pattern $T_2$ shown for $TSF_2$ in FIG. 3 would instead be replaced with the mixed tone pattern $T_1$.

Figure 7A:
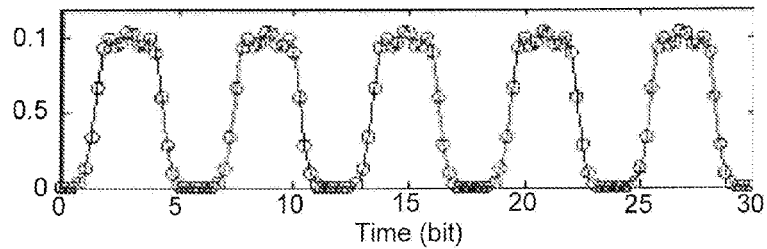
FIG. 7A shows the amplitude of a representative single tone pattern as a function of time.
Figure 7B:
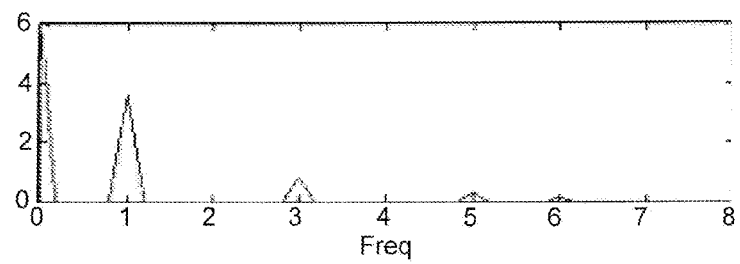
FIG. 7B shows the amplitude of the first and third harmonics of the single tone pattern of FIG. 7A.
Figure 8A:
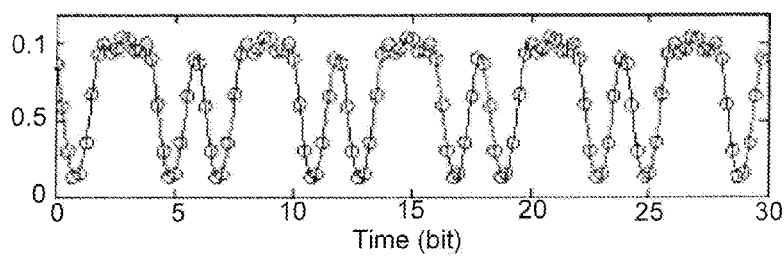
FIG. 8A shows the amplitude of a representative mixed tone pattern as a function of time.
Figure 8B:
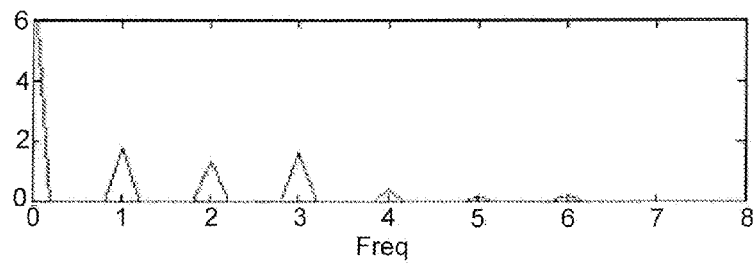
FIG. 8B shows the amplitude of the first and third harmonics of the mixed tone pattern of FIG. 8A.

FIG. 7A shows the amplitude of a single tone pattern 111000111000 as a function of time, and FIG. 7B shows the amplitude of the first and third harmonics of this single tone pattern. It can be seen in FIG. 7B that the amplitude of the third harmonic is significantly smaller than that of the first harmonic. FIG. 8A shows the amplitude of a mixed tone pattern 111010 as a function of time, and FIG. 8B shows the amplitude of the first and third harmonics of this mixed tone pattern. It can be seen in FIG. 8B that the amplitude of the third harmonic is about the same as that of the first harmonic. It is noted that, since the mixed tone pattern has frequency components other than the one of interest useful for timing acquisition, these frequency components may dilute the pattern's timing information value. As such, the timing synchronization field 220 may be increased in length to compensate for the loss, which reduces format efficiency.

Figure 9A:
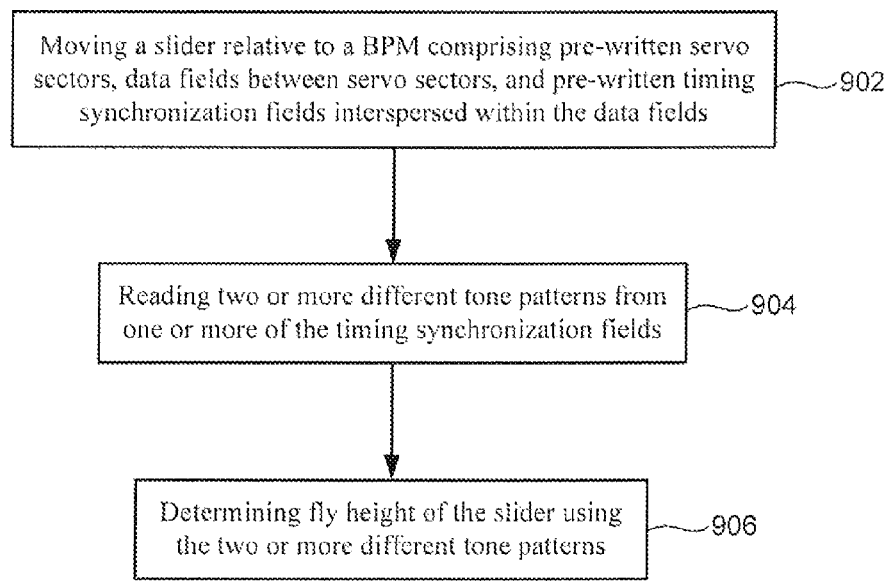
FIG. 9A is a flow chart illustrating a method for determining slider fly height relative to a bit patterned medium in accordance with various embodiments.

The following methodologies can be implemented using timing synchronization fields of a bit pattern medium in accordance with various embodiments. FIG. 9A is a flow chart illustrating a method for determining slider fly height relative to a bit patterned medium in accordance with some embodiments. The method shown in FIG. 9A involves moving 902 a slider relative to the bit pattern medium comprising pre-written servo sectors, data fields between servo sectors, and pre-written timing synchronization fields interspersed within the data fields. The method also involves reading 904 two or more different tone patterns from one or more of the synchronization fields. The method further involves determining 906 fly height of the slider using the two or more different tone patterns.

Figure 9B:
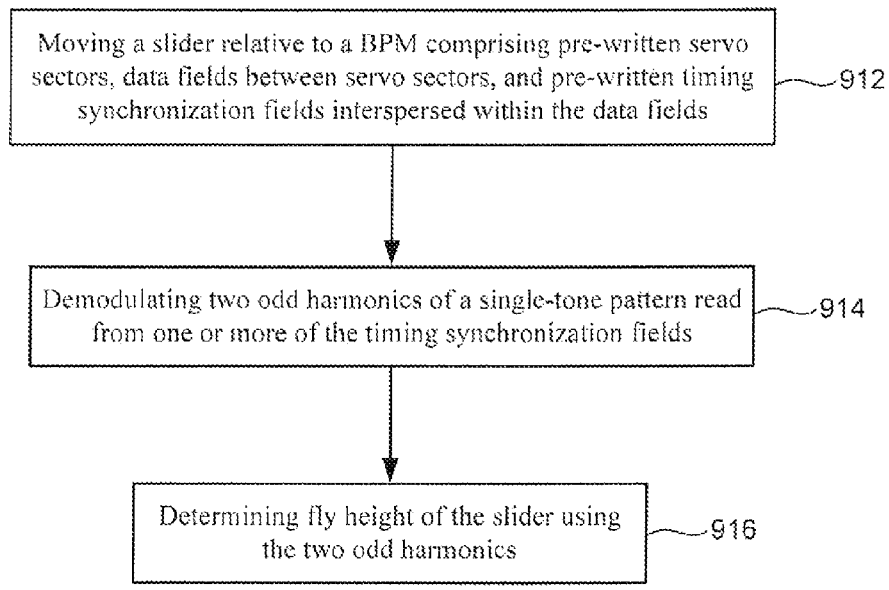
FIG. 9B is a flow chart illustrating a method for determining slider fly height relative to a bit patterned medium in accordance with some embodiments.

FIG. 9B is a flow chart illustrating a method for determining slider fly height relative to a bit patterned medium in accordance with other embodiments. The method shown in FIG. 9B involves moving 912 a slider relative to a bit pattern medium comprising pre-written servo sectors, data fields between servo sectors, and pre-written timing synchronization fields interspersed within the data fields. The method also involves demodulating 914 two odd harmonics of a single mixed-tone pattern read from one or more of the timing synchronization fields. The method further involves determining 916 fly height of the slider using the two odd harmonics.

Figure 10:
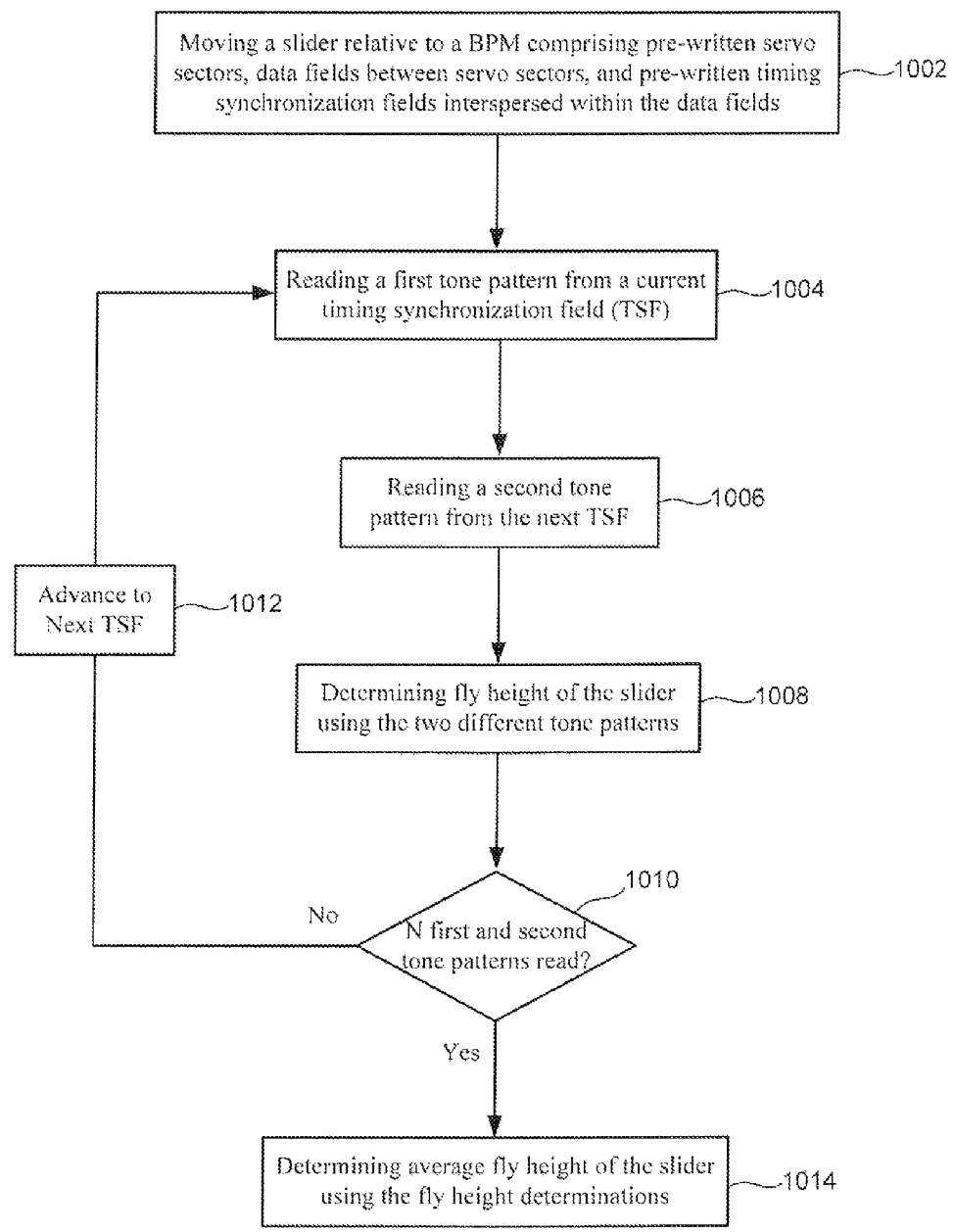
FIG. 10 is a flow chart illustrating a method for determining slider fly height relative to a bit patterned medium in accordance with other embodiments.

FIG. 10 is a flow chart illustrating a method for determining slider fly height relative to a bit patterned medium in accordance with various embodiments. The method shown in FIG. 10 involves moving 1002 a slider relative to the bit pattern medium comprising pre-written servo sectors, data fields between servo sectors, and pre-written timing synchronization fields interspersed within the data fields. The method involves reading 1004 a first tone pattern from the current timing synchronization field, reading 1006 a second tone pattern from the next timing synchronization field, and determining 1008 fly height of the slider using the two different tone patterns. A check 1010 is made to determine if a predetermined number, N (e.g., N=5 or 10), of the first and second tone patterns has been read. If not, the slider advances 1012 to the next timing synchronization pattern, and the processes of blocks 1004-1010 are repeated. When the predetermined number, N, is reached, and average slider fly height is determined 1014 using the fly height determinations 1008.

Figure 11:
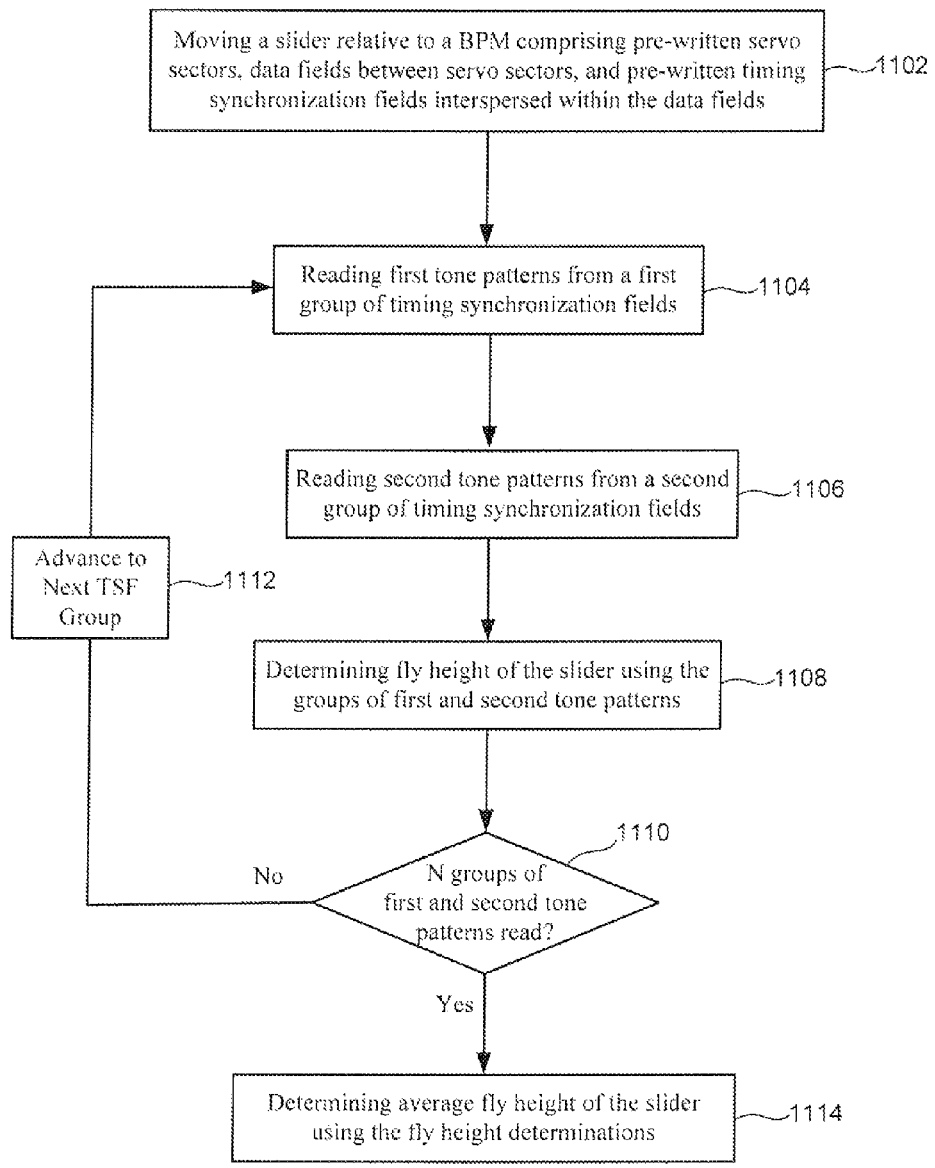
FIG. 11 is a flow chart illustrating a method for determining slider fly height relative to a bit patterned medium in accordance with further embodiments.

FIG. 11 is a flow chart illustrating a method for determining slider fly height relative to a bit patterned medium in accordance with various embodiments. The method shown in FIG. 11 involves moving 1102 a slider relative to the bit pattern medium comprising pre-written servo sectors, data fields between servo sectors, and pre-written timing synchronization fields interspersed within the data fields. The method involves reading 1104 first tone patterns from a first group of timing synchronization fields, and reading 1106 second tone patterns from a second group of timing synchronization fields. The method also involves determining 1108 fly height of the slider using the groups of first and second tone patterns. A check 1110 is made to determine if a predetermined number, N, of the first and second tone pattern groups has been read. If not, the slider advances 1112 to the next group of timing synchronization fields, and the processes of blocks 1104-1110 are repeated. When the predetermined number, N, is reached, an average slider fly height is determined 1114 using the fly height determinations 1108.

Figure 12:
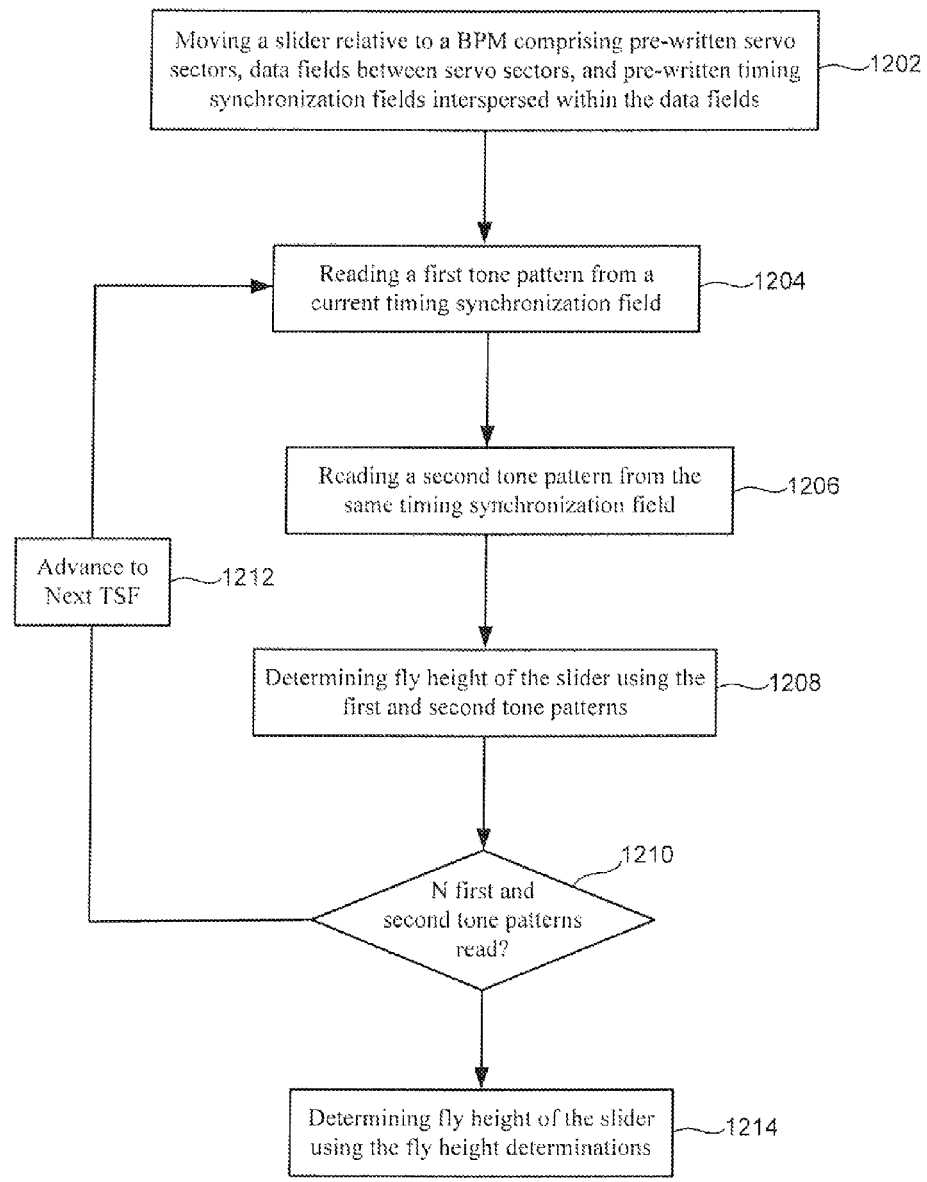
FIG. 12 is a flow chart illustrating a method for determining slider fly height relative to a bit patterned medium in accordance with some embodiments.

FIG. 12 is a flow chart illustrating a method for determining slider fly height relative to a bit patterned medium in accordance with various embodiments. The method shown in FIG. 12 involves moving 1202 a slider relative to the bit pattern medium comprising pre-written servo sectors, data fields between servo sectors, and pre-written timing synchronization fields interspersed within the data fields. The method involves reading 1204 a first tone pattern from a current timing synchronization field, and reading 1206 a second tone pattern from the same timing synchronization field. The method also involves determining 1208 fly height of the slider using the first and second tone patterns. A check 1210 is made to determine if a predetermined number, N, of the first and second tone patterns has been read. If not, the slider advances 1212 to the next timing synchronization pattern, and the processes of blocks 1204-1210 are repeated. When the predetermined number, N, is reached, and average slider fly height is determined 1214 using the fly height determinations 1208.

Figure 13:
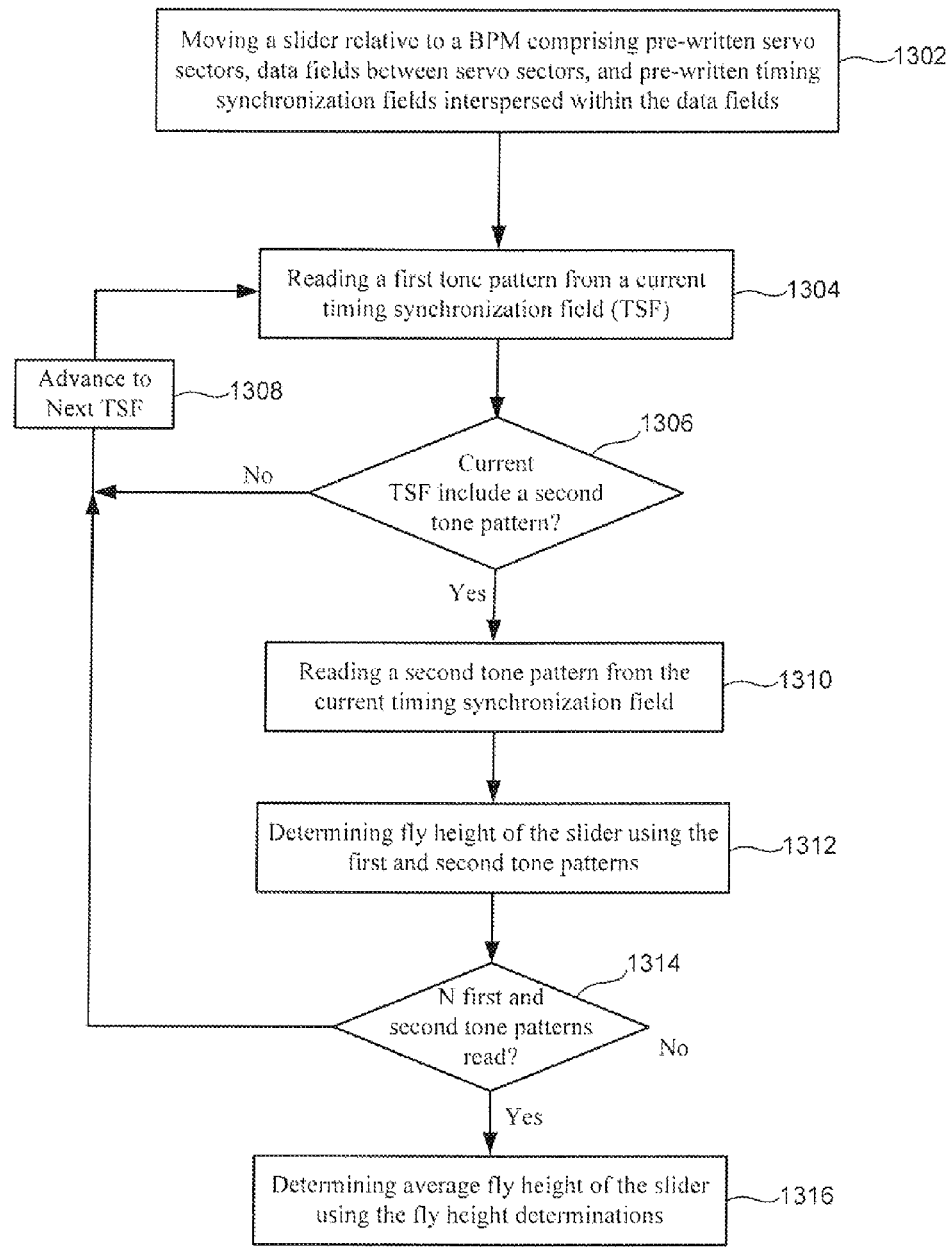
FIG. 13 is a flow chart illustrating a method for determining slider fly height relative to a bit patterned medium in accordance with other embodiments.

FIG. 13 is a flow chart illustrating a method for determining slider fly height relative to a bit patterned medium in accordance with various embodiments. The method shown in FIG. 13 involves moving 1302 a slider relative to the bit pattern medium comprising pre-written servo sectors, data fields between servo sectors, and pre-written timing synchronization fields interspersed within the data fields. The method involves reading 1304 a first tone pattern from a current timing synchronization field, and determining 1306 if the current timing synchronization field includes a second tone pattern. If not, the slider advances 1308 to the next timing synchronization field and the processes at blocks 1304 and 1306 are repeated. If the current timing synchronization field includes the second tone pattern, the method involves reading 1310 this second tone pattern and determining 1312 fly height of the slider using the first and second tone patterns. A check 1314 is made to determine if a predetermined number, N, of the first and second tone patterns has been read. If not, the slider advances 1308 to the next timing synchronization pattern, and the processes of blocks 1304-1314 are repeated. When the predetermined number, N, is reached, and average slider fly height is determined 1316 using the fly height determinations 1312.

Figure 14:
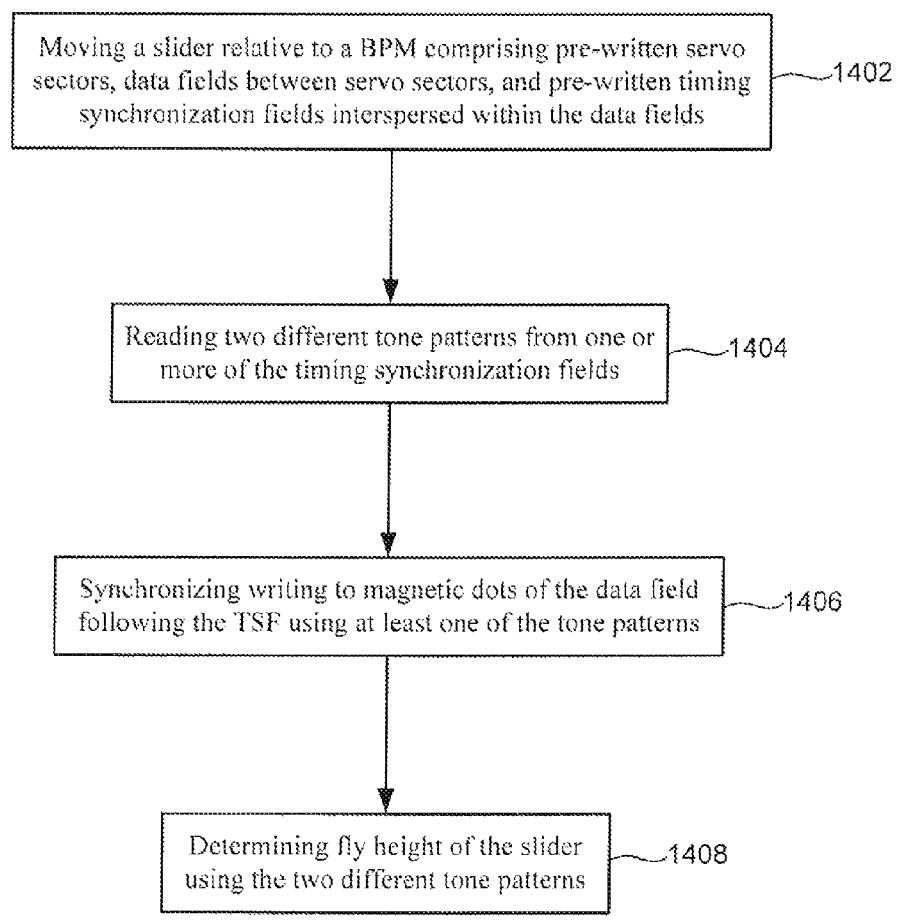
FIG. 14 is a flow chart illustrating a method for determining slider fly height relative to a bit patterned medium and performing write synchronization in accordance with various embodiments.

FIG. 14 is a flow chart illustrating a method for determining slider fly height relative to a bit patterned medium and performing write synchronization in accordance with various embodiments. The method shown in FIG. 14 involves moving 1402 a slider relative to the bit pattern medium comprising pre-written servo sectors, data fields between servo sectors, and pre-written timing synchronization fields interspersed within the data fields. The method involves reading 1404 two different tone patterns from one or more of the timing synchronization fields. The method also involves synchronizing 1406 writing to magnetic dots of the data field following the timing synchronization field using at least one of the tone patterns. The method further involves determining 1408 fly height of the slider using the two different tone patterns.

Figure 15:
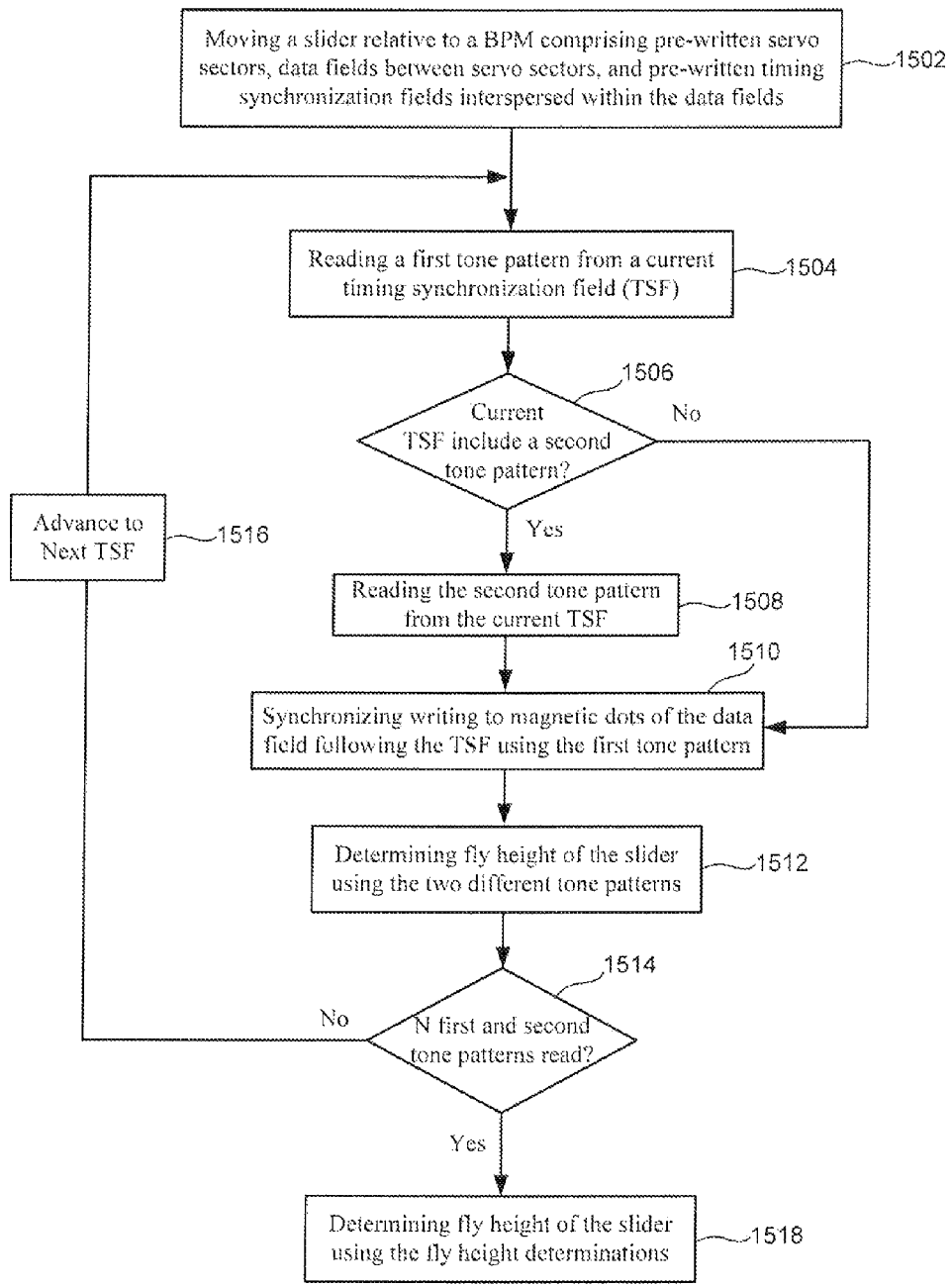
FIG. 15 is a flow chart illustrating a method for determining slider fly height relative to a bit patterned medium and performing write synchronization in accordance with some embodiments.

FIG. 15 is a flow chart illustrating a method for determining slider fly height relative to a bit patterned medium and performing write synchronization in accordance with various embodiments. The method shown in FIG. 15 involves moving 1502 a slider relative to the bit pattern medium comprising pre-written servo sectors, data fields between servo sectors, and pre-written timing synchronization fields interspersed within the data fields. The method involves reading 1504 a first tone pattern from the current timing synchronization field, and determining 1506 if the current timing synchronization field includes a second tone pattern. If so, the second tone pattern is read 1508 from the current timing synchronization field. If the current timing synchronization field does not include a second tone pattern (as tested at 1506) or after a second tone pattern has been read from the current timing synchronization field (as performed at 1508), the method involves synchronizing 1510 writing to magnetic dots of the data field following the timing synchronization field using the first tone pattern. The method further involves determining 1512 fly height of the slider using the two different tone patterns. A check 1514 is made to determine if a predetermined number, N, of the first and second tone patterns has been read. If not, the slider advances 1516 to the next timing synchronization pattern, and the processes of blocks 1504-1514 are repeated. When the predetermined number, N, is reached, and average slider fly height is determined 1518 using the fly height determinations 1512.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
   moving a slider having a reader and a writer relative to a magnetic bit pattern medium comprising magnetic dots arranged to include a plurality of pre-written servo sectors, data fields defined between servo sectors to which data can be written and erased, and pre-written timing synchronization fields interspersed within the data fields;
   reading two different tone patterns from one or more of the timing synchronization fields; and
   determining fly height of the slider using the two different tone patterns.

2. The method of claim 1, wherein reading comprises reading each of the two different tone patterns from different timing synchronization fields.

3. The method of claim 1, wherein reading comprises reading the two different tone patterns alternately from different timing synchronization fields.

4. The method of claim 1, wherein reading comprises:
   reading a first tone pattern from a first group of timing synchronization fields; and
   subsequent to reading the first tone patterns from the first group, reading a second tone pattern from a second group of timing synchronization fields.

5. The method of claim 1, wherein reading comprises reading the two different tone patterns from each of the one or more individual timing synchronization fields.

6. The method of claim 5, wherein reading comprises:
   reading a first tone pattern from each of the timing synchronization fields; and
   reading a second tone pattern from some but not all of the timing synchronization fields.

7. The method of claim 1, comprising:
   reading a first tone pattern from each of the timing synchronization fields and synchronizing writing to dots of the data fields using the first tone patterns;
   reading a second tone pattern from at least some of the timing synchronization fields; and
   determining fly height of the slider using the first and second tone patterns.

8. The method of claim 1, comprising:
   measuring an amplitude of a first harmonic of the two different tone patterns;
   wherein determining fly height comprises determining fly height of the slider using the first harmonic amplitudes.

9. The method of claim 1, comprising:
   measuring an amplitude of a first harmonic of the two different tone patterns;
   wherein determining fly height of the slider comprises calculating a Wallace Spacing Loss using the first harmonic amplitudes.

10. The method of claim 1, comprising:
    measuring a first amplitude of a first harmonic of the two different tone patterns for a slider-medium contact condition;
    determining a reference metric using the first harmonic amplitudes for the slider-medium contact condition;
    measuring a second amplitude of a first harmonic of the two different tone patterns for a slider-medium separation condition; and
    determining an absolute fly height of the slider for the slider-medium separation condition using the second amplitudes and the reference metric.

11. An apparatus, comprising:
    a slider configured to magnetically interact with a magnetic bit pattern medium comprising magnetic dots arranged to include a plurality of pre-written servo sectors, data fields defined between servo sectors to which data can be written and erased, and pre-written timing synchronization fields interspersed within the data fields;
    a reader of the slider configured to read two different tone patterns from one or more of the timing synchronization fields; and
    a detector configured to determine fly height of the slider using the two different tone patterns.

12. The apparatus of claim 11, wherein the reader is configured to read the two different tone patterns alternately from different timing synchronization fields.

13. The apparatus of claim 11, wherein the reader is configured to:
    read a first tone pattern from a first group of timing synchronization fields; and
    subsequent to reading the first tone patterns from the first group, read a second tone pattern from a second group of timing synchronization fields.

14. The apparatus of claim 11, wherein the reader is configured to read the two different tone patterns from each of the one or more individual timing synchronization fields.

15. The apparatus of claim 11, wherein the reader is configured to:
    read a first tone pattern from each of the individual timing synchronization fields; and
    read a second tone pattern from some but not all of the individual timing synchronization fields.

16. The apparatus of claim 11, wherein the detector is configured to:
    measure an amplitude of a first harmonic of the two different tone patterns; and
    calculate a Wallace Spacing Loss using the first harmonic amplitudes.

17. The apparatus of claim 11, wherein:

the reader is configured to read a first tone pattern from each of the timing synchronization fields;

the reader is configured to read a second tone pattern from at least some of the timing synchronization fields;

the detector is configured to determine fly height of the slider using the first and second tone patterns; and the apparatus further comprises a controller configured to synchronize writing to magnetic dots of the data fields using the first tone patterns.

18. A method, comprising:

moving a slider having a reader and a writer relative to a magnetic bit pattern medium comprising magnetic dots, the medium comprising a plurality of pre-written servo sectors, data fields defined between servo sectors to which data can be written and erased, and pre-written timing synchronization fields interspersed within the data fields;

demodulating two odd harmonics of a mixed tone pattern read from one or more of the timing synchronization fields; and determining fly height of the slider using the two odd harmonics.

19. The method of claim 18, further comprising synchronizing writing to dots of the data fields using the mixed tone pattern of the timing synchronization fields.

20. An apparatus, comprising:

a magnetic bit pattern medium comprising a plurality of magnetic dots arranged to include:

a plurality of pre-written servo sectors;

a plurality of data fields defined between servo sectors to which data can be written and erased; and a plurality of pre-written timing synchronization fields interspersed within the data fields, the timing synchronization fields comprising:

a first tone pattern pre-written to each of the timing synchronization fields and configured to facilitate synchronization of writing to magnetic dots of the data fields; and a second tone pattern different from the first tone pattern and pre-written to at least some of the timing synchronization fields, the first and second tone patterns configured to facilitate slider fly height determinations.

21. The apparatus of claim 20, wherein the first and second tone patterns are pre-written alternately to the timing synchronization fields.

22. The apparatus of claim 20, wherein:

the first tone pattern is pre-written to each of the timing synchronization fields; and the second tone pattern is pre-written to some but not all of the timing synchronization fields.

* * * * *